(12) United States Patent
Bessemer et al.

(10) Patent No.: US 11,364,657 B2
(45) Date of Patent: Jun. 21, 2022

(54) REDUCING MOISTURE IN GRANULAR RESIN MATERIAL USING INERT GAS

(71) Applicant: Novatec, Inc., Baltimore, MD (US)

(72) Inventors: Conrad Bessemer, Millersville, MD (US); Mark Haynie, Pasadena, MD (US)

(73) Assignee: Novatec, Inc., Baltimore, MD (US)

(*) Notice: Subject to any disclaimer, the term of this patent is extended or adjusted under 35 U.S.C. 154(b) by 30 days.

(21) Appl. No.: 16/803,527

(22) Filed: Feb. 27, 2020

(65) Prior Publication Data

US 2020/0254652 A1 Aug. 13, 2020

Related U.S. Application Data

(63) Continuation-in-part of application No. 16/732,513, filed on Jan. 2, 2020, now Pat. No. 11,203,133, and a
(Continued)

(51) Int. Cl.
*F26B 3/00* (2006.01)
*B29B 9/16* (2006.01)
(Continued)

(52) U.S. Cl.
CPC .............. *B29B 9/16* (2013.01); *B29B 13/065* (2013.01); *F26B 3/08* (2013.01); *F26B 25/005* (2013.01); *B29B 2009/168* (2013.01)

(58) Field of Classification Search
CPC ......... B29B 9/16; B29B 13/065; B29B 13/02; B29B 2009/168; F26B 25/005; F26B 3/08;
(Continued)

(56) References Cited

U.S. PATENT DOCUMENTS

| 512,673 A | 1/1894 | Mason |
|---|---|---|
| 753,597 A | 3/1904 | Long |

(Continued)

FOREIGN PATENT DOCUMENTS

| AU | 417596 | 6/1971 |
|---|---|---|
| CA | 1100402 | 5/1981 |

(Continued)

OTHER PUBLICATIONS

Thirty-nine page brochure entitled "Maguire Low Pressure Dryer: Sep. 7, 2000: Installation Operation Maintenance", 2000.
(Continued)

*Primary Examiner* — John P McCormack
(74) *Attorney, Agent, or Firm* — Fox Rothschild LLP

(57) ABSTRACT

An apparatus for drying granular resin material in a hopper including a first sub-system, including a membrane and a heater receiving drying gas from the membrane to be heated, the first sub-system supplying dried heated gas to a first portion of the hopper; and a second sub-system, including a mixing device and a heater for receiving drying gas from the mixing device to be heated, the mixing device inducing withdrawal of gas from the hopper and mixing the withdrawn gas with gas supplied from the first subsystem, the mixed gases being heated and supplied to a second portion of the hopper, the improvement comprising a gas separation membrane for separating inert gases from air supplied to the apparatus and providing the separated inert gas in the first subsystem; a heater for heating air supplied to the apparatus; and a thermostat for controlling the heater and thereby maintaining the supplied air at a selected temperature.

15 Claims, 2 Drawing Sheets

Related U.S. Application Data continuation-in-part of application No. 16/373,987, filed on Apr. 3, 2019, now abandoned.

(60) Provisional application No. 62/825,933, filed on Mar. 29, 2019, provisional application No. 62/811,680, filed on Feb. 28, 2019, provisional application No. 62/652,612, filed on Apr. 4, 2018.

(51) Int. Cl.
   *B29B 13/06* (2006.01)
   *F26B 25/00* (2006.01)
   *F26B 3/08* (2006.01)

(58) Field of Classification Search
   CPC .. F26B 3/06; F26B 21/08; F26B 21/12; F26B 21/14; F26B 21/04; F26B 21/10; F26B 17/1425
   USPC .......................................... 34/443, 446, 452
   See application file for complete search history.

(56) References Cited

U.S. PATENT DOCUMENTS

| | | |
|---|---|---|
| 960,857 A | 6/1910 | Eggert |
| 1,520,017 A | 12/1924 | Denton |
| 1,620,289 A | 3/1927 | Ridley |
| 1,625,451 A | 4/1927 | Brown |
| 2,161,190 A | 6/1939 | Paull |
| 2,550,240 A | 4/1951 | Geiger et al. |
| 2,569,085 A | 9/1951 | David et al. |
| 2,587,338 A | 2/1952 | Lee et al. |
| 3,111,115 A | 11/1963 | Best |
| 3,113,032 A | 12/1963 | Wayne |
| 3,115,276 A | 12/1963 | Johanningmeier |
| 3,138,117 A | 6/1964 | Dorey |
| 3,144,310 A | 8/1964 | Glatt et al. |
| 3,209,898 A | 10/1965 | Beebe et al. |
| 3,348,848 A | 10/1967 | Lucking et al. |
| 3,395,634 A | 8/1968 | Smith, Jr. |
| 3,470,994 A | 10/1969 | Schnell et al. |
| 3,554,143 A | 1/1971 | Rodgers |
| 3,597,850 A | 8/1971 | Jenkins |
| 3,628,508 A | 12/1971 | Kummel |
| 3,630,352 A | 12/1971 | Morse |
| 3,649,202 A | 3/1972 | Bajek et al. |
| 3,698,098 A | 10/1972 | Ramsay |
| 3,733,713 A * | 5/1973 | Williamson, Jr. ......... F26B 3/08 34/586 |
| 3,780,446 A | 12/1973 | Frimberger |
| 3,834,038 A | 9/1974 | Janda |
| 3,959,636 A | 5/1976 | Johnson et al. |
| 3,969,314 A | 7/1976 | Grigull |
| 3,985,262 A | 10/1976 | Nauta |
| 4,026,442 A | 5/1977 | Orton |
| 4,108,334 A | 8/1978 | Moller |
| 4,127,947 A | 12/1978 | Webb et al. |
| 4,148,100 A | 4/1979 | Moller |
| 4,179,819 A | 12/1979 | Pryor |
| 4,219,136 A | 8/1980 | Williams et al. |
| 4,294,020 A | 10/1981 | Evans |
| 4,322,970 A | 4/1982 | Peter |
| 4,347,670 A | 9/1982 | Wear et al. |
| 4,351,119 A | 9/1982 | Meunier |
| 4,354,622 A | 10/1982 | Wood |
| 4,357,830 A | 11/1982 | Kohama et al. |
| 4,364,666 A | 12/1982 | Keyes |
| 4,394,941 A | 7/1983 | Recine |
| 4,399,697 A | 8/1983 | Kohama et al. |
| 4,402,436 A | 9/1983 | Hellgren |
| 4,413,426 A | 11/1983 | Graff |
| 4,414,847 A | 11/1983 | Kohama et al. |
| 4,439,213 A | 3/1984 | Frey |
| 4,454,943 A | 6/1984 | Moller |
| 4,475,672 A | 10/1984 | Whitehead |
| 4,479,309 A | 10/1984 | Tolson |
| 4,498,783 A | 2/1985 | Rudolph |
| 4,505,407 A | 3/1985 | Johnson |
| 4,510,106 A | 4/1985 | Hirsch |
| 4,525,071 A | 6/1985 | Horowitz et al. |
| 4,531,308 A | 7/1985 | Neilson et al. |
| 4,544,279 A | 10/1985 | Rudolph |
| 4,581,704 A | 4/1986 | Mitsukawa |
| 4,603,489 A | 8/1986 | Goldberg |
| 4,619,379 A | 10/1986 | Biehl |
| 4,705,083 A | 11/1987 | Rossetti |
| 4,732,318 A | 3/1988 | Osheroff |
| 4,756,348 A | 7/1988 | Moller |
| 4,793,711 A | 12/1988 | Ohlson |
| 4,830,508 A | 5/1989 | Higuchi et al. |
| 4,848,534 A | 7/1989 | Sandwall |
| 4,850,703 A | 7/1989 | Hanaoka et al. |
| 4,924,601 A | 5/1990 | Bercaw |
| 4,938,061 A | 7/1990 | Carp |
| 4,952,856 A | 8/1990 | Schmitz |
| 5,064,328 A | 11/1991 | Raker |
| 5,110,521 A | 5/1992 | Moller |
| 5,115,577 A | 5/1992 | Kramer |
| 5,116,547 A | 5/1992 | Tsukahara et al. |
| 5,132,897 A | 7/1992 | Allenberg |
| 5,143,166 A | 9/1992 | Hough |
| 5,148,943 A | 9/1992 | Moller |
| 5,172,489 A | 12/1992 | Moller |
| 5,205,050 A | 4/1993 | Masaaki et al. |
| 5,225,210 A | 7/1993 | Shimoda |
| 5,252,008 A | 10/1993 | May, III et al. |
| 5,261,743 A | 11/1993 | Moller |
| 5,285,930 A | 2/1994 | Nielsen |
| 5,293,697 A | 3/1994 | Kawakami |
| 5,340,241 A | 8/1994 | Thiele et al. |
| 5,340,949 A | 8/1994 | Fujimura et al. |
| 5,341,961 A | 8/1994 | Hausam |
| 5,409,991 A | 4/1995 | Mitsuno et al. |
| 5,423,455 A | 6/1995 | Ricciardi et al. |
| 5,426,415 A | 6/1995 | Prachar et al. |
| 5,433,020 A | 7/1995 | Leech |
| 5,487,225 A | 1/1996 | Downie |
| 5,501,143 A | 3/1996 | Thom, Jr. |
| 5,513,445 A | 5/1996 | Farrag |
| 5,527,107 A | 6/1996 | Weibel |
| 5,594,035 A | 1/1997 | Walsh |
| 5,632,805 A | 5/1997 | Woodard |
| 5,651,401 A | 7/1997 | Cados |
| 5,732,478 A | 3/1998 | Chapman |
| 5,736,683 A | 4/1998 | Howard |
| 5,767,453 A | 6/1998 | Wakou et al. |
| 5,767,455 A | 6/1998 | Mosher |
| 5,780,779 A | 7/1998 | Kitamura et al. |
| 5,807,422 A | 9/1998 | Grgich et al. |
| 5,810,961 A | 9/1998 | Andersen et al. |
| 5,843,513 A | 12/1998 | Wilke et al. |
| 5,896,675 A | 4/1999 | Holler et al. |
| 6,079,122 A | 6/2000 | Rajkovich |
| 6,151,795 A | 11/2000 | Hoffman et al. |
| 6,154,980 A | 12/2000 | Maguire |
| 6,158,147 A * | 12/2000 | Smith ................... F26B 21/001 34/168 |
| 6,315,902 B1 | 11/2001 | Collasius et al. |
| 6,321,461 B1 | 11/2001 | Ogasahara |
| 6,357,294 B1 | 3/2002 | Nakada |
| 6,449,875 B1 | 9/2002 | Becker et al. |
| 6,584,701 B1 * | 7/2003 | Brown ................ F26B 17/1408 34/169 |
| 7,007,402 B1 | 3/2006 | Gillette |
| 7,234,247 B2 | 6/2007 | Maguire |
| 7,343,700 B2 | 3/2008 | Zlotos |
| 7,347,007 B2 | 3/2008 | Maguire |
| 8,141,270 B2 | 3/2012 | Gera, Jr. |
| 8,776,392 B2 | 7/2014 | Maguire |
| RE45,408 E | 3/2015 | Maguire |
| RE45,501 E | 5/2015 | Maguire |
| 2002/0024162 A1 | 2/2002 | Maguire |
| 2002/0092525 A1 | 7/2002 | Rump et al. |
| 2005/0092675 A1 | 5/2005 | Nakahara et al. |

(56) References Cited

U.S. PATENT DOCUMENTS

| | | | |
|---|---|---|---|
| 2006/0168843 | A1 | 8/2006 | Zlotos |
| 2007/0199203 | A1 | 8/2007 | Federico |
| 2007/0234702 | A1 | 10/2007 | Hagen et al. |
| 2008/0029546 | A1 | 2/2008 | Schuld |
| 2008/0237361 | A1 | 10/2008 | Wang |
| 2009/0059714 | A1 | 3/2009 | Pikus et al. |
| 2010/0170102 | A1 | 7/2010 | Chih |
| 2010/0217445 | A1 | 8/2010 | Moretto |
| 2010/0229420 | A1 | 9/2010 | Garrido |
| 2011/0035959 | A1 | 2/2011 | Gera, Jr. |
| 2011/0106475 | A1 | 5/2011 | Wigen |
| 2011/0283554 | A1 | 11/2011 | Kuhnau et al. |
| 2012/0066924 | A1 | 3/2012 | Ando |
| 2012/0311884 | A1 | 12/2012 | Eisinger et al. |
| 2014/0239533 | A1 | 8/2014 | Maguire |
| 2015/0300737 | A1 | 10/2015 | Maguire |
| 2015/0316320 | A1 | 11/2015 | Maguire |
| 2016/0151936 | A1 | 6/2016 | Maguire |
| 2017/0261261 | A1 | 9/2017 | Maguire |

FOREIGN PATENT DOCUMENTS

| | | |
|---|---|---|
| CH | 688217 | 6/1997 |
| CN | 101968300 A | 2/2011 |
| CN | 203331276 U | 12/2013 |
| DE | 318127 | 3/1914 |
| DE | 421770 | 11/1925 |
| DE | 623000 | 6/1937 |
| DE | 3541532 | 5/1986 |
| DE | 3923241 | 1/1991 |
| DE | 4300060 | 7/1994 |
| DE | 4300595 | 7/1994 |
| DE | 4323295 | 2/1995 |
| DE | 19740338 A1 | 3/1999 |
| DE | 19842778 A1 | 3/2000 |
| DE | 102004034293 A1 | 2/2006 |
| EP | 0132482 | 2/1985 |
| EP | 0318170 | 5/1989 |
| EP | 0466362 | 1/1992 |
| EP | 0507689 | 10/1992 |
| EP | 0587085 | 3/1994 |
| EP | 0743149 | 11/1996 |
| EP | 0997695 | 5/2000 |
| EP | 1004856 A2 | 5/2000 |
| EP | 1288600 | 3/2003 |
| EP | 1306635 A1 | 5/2003 |
| FR | 802618 | 9/1936 |
| FR | 2109840 | 5/1972 |
| FR | 2235775 | 1/1975 |
| FR | 2517087 | 5/1983 |
| FR | 2695988 | 3/1994 |
| GB | 479090 | 1/1938 |
| GB | 671085 | 4/1952 |
| GB | 849613 | 9/1960 |
| GB | 2081687 | 2/1982 |
| JP | 58133308 A | 8/1983 |
| JP | 58155423 A | 9/1983 |
| JP | 59082936 | 5/1984 |
| JP | 59187081 A | 10/1984 |
| JP | 59190623 A | 10/1984 |
| JP | 59204731 A | 11/1984 |
| JP | 62083622 A | 4/1987 |
| JP | 01286806 | 6/1987 |
| JP | 01235604 | 9/1989 |
| JP | 02077619 A | 3/1990 |
| JP | 02293501 A | 12/1990 |
| JP | 03020619 A | 1/1991 |
| JP | 03172716 A | 7/1991 |
| JP | 4201522 | 7/1992 |
| JP | 04278423 A | 10/1992 |
| JP | 04320946 A | 11/1992 |
| JP | 05142006 A | 6/1993 |
| JP | 06080015 A | 3/1994 |
| JP | 6114834 | 4/1994 |
| JP | 10310210 | 11/1998 |
| JP | 11064059 A | 3/1999 |
| JP | 2000-229331 A | 8/2000 |
| JP | 2000257809 A | 9/2000 |
| JP | 2002174541 A | 6/2002 |
| JP | 2012086392 | * 5/2012 |
| JP | 2012-131118 | 7/2012 |
| WO | WO 1999/015324 | 4/1999 |
| WO | WO 1999/037964 | 7/1999 |
| WO | WO 2001/49471 | 7/2001 |
| WO | WO 2006/002124 A1 | 1/2006 |
| WO | WO 2007/116022 A2 | 10/2007 |

OTHER PUBLICATIONS

Two-sided color brochure entitled "NovaDrier N Series Dryer" published by Novatec Inc., undated.
International Search Report for PCT/US98/19464 (WO 99/15324).
International Search Report for PCT/US02/19294.
Two page two-sided color brochure entitled "LPD Series Dryers: New Directions in drying technology" of Maguire Products, Inc., Jun. 6, 2000.
One page two-sided color brochure entitled "Drying Systems: WGR Gas Dryer Retrofit" of AEC Whitlock, 1997.
Two page two-sided color brochure entitled "Drying Systems: Mass Flow.TM. Series Drying Hoppers" of AEC Whitlock, 1998.
Four page color brochure entitled "Speedryer Thermodynamic Hopper Dryer" of Canam Manufactured Products Inc., Dec. 10, 2001.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Three page two-sided color brochure entitled "Portable Drying and Conveying Systems: Nomad.TM. Series Portable Dryers", AEC Whitlock, 1998.
Two page two-sided color brochure entitled "Drying Systems: WD Series Dehumidifying Dryers" of AEC Whitlock, 1997.
Five page two-sided color brochure entitled "AEC Auxiliaries As Primary", AEC, Inc., 1999.
Two page two-sided color brochure entitled "LPD Vacuum Dryers" of Maguire Products, Inc. Jun. 6, 2000.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu.TM. Loading System" of Maguire Products, Inc., dated Nov. 12, 1996, Charlotte, NC.
One page color advertisement entitled "This little vacuum dryer can do in 40 minutes what it takes your desiccant dryer to do in 4 hours.", Plastic News dated Nov. 19, 2001.
One page color article entitled "Dryer Competition Heats Up With New Designs", Modern Plastics, Jul. 2001, p. 68.
One page advertisement of Frigomeccanica Industriale, Modern Plastics, Jul. 2001, p. 70.
16 page Low Pressure Dryer Technical Information Specifications Features of Maguire Products, Inc. dated Nov. 29, 2000.
One page article entitled "New Dryer Technologies at NPE Aren't Just Hot Air", Plastics Technology, Aug. 2000, p. 19.
One page article entitled "Tech Preview", Automatic Plastics, Aug. 2000, p. 66.
One page article entitled "Maguire expands Low Pressure Dryer commercialization" from www.specialchem.com dated Mar. 30, 2001.
One page article entitled "Smaller Resin Dryer", Plastics Engineering, Aug. 2001, p. 28.
Five page brochure entitled LPD.TM. Series Dryers of Maguire Products, Inc. dated Jan. 29, 2001.

(56) References Cited

OTHER PUBLICATIONS

Two page press released entitled "Maguire® LPD™30, Smaller Model of Breakthrough Resin Dryer, Will Make World Debut at K 2001 Show" of Maguire Products, Inc. dated Jun. 29, 2001.
Three page press release entitled "In Commercial Use by Wide Range of Plastic Processors, Maguire.RTM. LPD.TM. Resin Dryer Yields Big Savings in Energy Costs" of Manuire Products. Inc. dated May 14, 2001.
Two page press release entitled "Maguire Obtains Patent on Fundamentally New Resin Dryer and Steps Up Program for Worldwide Commercialization" of Maguire Products, Inc. dated Dec. 18, 2000.
Six page press release entitled "Fast, Low-Cost Process Transforms Resin Drying, Promising Dramatic Advance in Industry Productivity and Quality" of Maguire Products, Inc. dated Jun. 20, 2000.
Two page press release entitled "New-Concept Resin Dryer Enables Custom Molder to Eliminate Reject Parts—and Once More Enjoy Sunday Evenings" of Maguire Products, Inc. dated Jun. 20, 2000.
One page color article entitled "Maguire LPD unit nets positive marks", Plastic News, Oct. 3, 2001, p. 3.
International Search Report for related application No. PCT/US2005/021851.
Five page Written Opinion of the International Searching Authority dated Sep. 29, 2005 in connection with International Patent Application No. PCT/US2005/021851.
Eight page European Search Report dated Sep. 23, 2005 in connection with European Patent Application No. EP05076911.
Maguire Products' in Brazilian Plastics—World Plastic News , "Maguire introduces new vacuum resin dryer based on gravity flow", Dated Mar. 22, 2013., "Expo Plast", 8th Fair of Suppliers for the Plastics Processing Industry. Aug. 27-30, 2013. CENTRO.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Producs, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" Process Control Corporation, circa 1993.
Advertisement entitled "Weigh Blender Delivers Unmatched Accuracy" by Universal Dynamics, Inc., circa 1993.

Advertisement entitled "A Full Line-up of Blender Solutions . . . Priced Right" by HydReclaim, circla 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders" published by Maguire Products, Inc., 1995.
Forty-four page two-sided color brochure including cover and back pages entitled "Maguire: Auxiliary equipment for the plastics industry" Maguire Products, Inc., Oct. 2000.
Two-sided color brochure entitled "Convey, Blend, Dry" published by Novatec, Inc., undated.
International Search Report for related application No. PCT/US2015/028472.
Written Opinion of the International Searching Authority dated Jul. 15, 2015 for International Patent Application No. PCT/US2015/028472.
European Extended Search Report and Written Opinion dated Dec. 19, 2017 for European Patent Application No. 15785821.8; Publication No. 3137831.

* cited by examiner

REDUCING MOISTURE IN GRANULAR RESIN MATERIAL USING INERT GAS

CROSS-REFERENCE TO RELATED PATENT APPLICATIONS

This patent application claims the priority of U.S. Provisional Application No. 62/811,680, entitled Apparatus and Methods Using Inert Gas to Reduce Moisture in Granular Resin Materials, filed 28 Feb. 2019, the contents of which are incorporated by reference herein in their entirety; priority is claimed under 35 U.S.C. § 119(e).

This patent application also claims the priority of U.S. Provisional Application No. 62/825,933, entitled reducing Moisture in Granular Material Using Inert Gas, filed 29 Mar. 2019, the contents of which are incorporated by reference herein in their entirety; priority is claimed under 35 U.S.C. § 119(e).

This patent application is also a 35 USC § 120 continuation-in-part of, and claims the benefit of the filing date of, U.S. application Ser. No. 16/373,987, entitled "Method and Apparatus for Polymer Drying Using Inert Gas," filed 3 Apr. 2019, the contents of which are incorporated herein in their entirety; the priority is claimed under 35 USC § 120.

This patent application is also a 35 USC § 120 continuation-in-part of, and claims the benefit of the filing date of, U.S. application Ser. No. 16/732,513, entitled "Method and Apparatus for Polymer Drying Using Inert Gas," filed 2 Jan. 2020, the contents of which are incorporated herein in their entirety; the priority is claimed under 35 USC § 120.

This patent application also claims the benefit of the priority of U.S. Provisional Patent Application Ser. No. 62/652,612, filed 4 Apr. 2018 and entitled "Method and Apparatus for Producing Inert Gas to Inhibit Polymer Degradation"; the priority of the '612 application is claimed under 35 USC 120 through the '987 application.

INCORPORATION BY REFERENCE

This patent application incorporates by reference the disclosure of U.S. Pat. No. 6,584,701 issued 1 Jul. 2003 and the disclosure of United States patent application publication US/2019-0308344, which is application Ser. No. 16/373,987 noted above.

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

BACKGROUND OF THE INVENTION

This invention relates to apparatus and methods for drying material in a hopper containing solid granular material to be dried. The invention is more particularly concerned with apparatus and methods for reducing the moisture content of solid particulate or pelletized material, specifically granular resin material, prior to molding or extrusion thereof.

DESCRIPTION OF THE PRIOR ART

Conventional systems for drying particulate materials, especially granular resin material, rely on desiccants to remove moisture from a stream of drying air directed at the granular resin material. The desiccant, which is typically a molecular-sieve type material such as zeolite, captures moisture from the drying air stream to produce very low dew point air, which is in turn directed at the granular resin material, which is typically in a hopper, to dry the granular resin material to a desired moisture level. In a typical system, the desiccant is situated in a unit that is downstream from the hopper and is in a closed loop; the dehumidified air from the desiccant unit is recirculated around the loop and through the granular material hopper by a blower. A heater situated between the desiccant unit and the granular material hopper heats the low dew point air to a desired drying temperature for supply to the hopper.

The recommended dew point of air for drying granular resin material is ordinarily below 0° Fahrenheit and typically in a range of about −20° Fahrenheit to about −50° Fahrenheit, or lower. Desiccant type drying systems can readily provide such low dew point air.

Notwithstanding their wide use, desiccant type drying systems have significant drawbacks. These arise primarily from the fact that desiccant materials must be regenerated periodically in order to maintain their drying effectiveness. Desiccants dehumidify by adsorption. When used over a period of time, the desiccant material becomes loaded with water and loses its effectiveness as a drying media. To restore its effectiveness, the desiccant material is regenerated from time to time, usually by flowing a heated air stream through the desiccant unit to drive off the adsorbed moisture. This requires the desiccant unit to be taken off-line, interrupting the granular resin material drying process. Alternatively, the drying system may include a second desiccant unit which is used alternately with the first desiccant unit, or which is operated such that its on-line time overlaps the regeneration cycle of the first unit.

In granular resin drying systems using a single desiccant unit, down time associated with desiccant regeneration results in reduced granular resin material throughput. Systems employing multiple desiccant units can avoid this problem, but they are more expensive due to the need to provide additional desiccant units and correspondingly more complex system controls.

SUMMARY OF THE INVENTION

In one of its aspects this invention embraces drying apparatus using at least some and preferably essentially entirely all inert gas such as argon or nitrogen, preferably produced using a gas separation membrane. Suitable gas separation membranes for use in practicing this invention are produced by Air Products Corporation. Dow-Dupont Corporation, Parker, Henkle, Generan, and SMC.

In addition to granular polymers, the invention may be used to dry regrind polymer resin flakes, reprocessed regrind granular polymer resin, powders of polymer resin, and the like. Drying with inert gas in accordance with the invention preserves the strength, ductility, color, opaqueness, viscosity, chemical resistance, stiffness, and stability of the granular polymer resin material once it has fabricated into a finished or semi-finished product. All of these desirable properties and characteristics are subject to compromise if the granular polymer resin material is dried in the presence of air or pure oxygen; the compromise is reduced when more inert gas is used and less air is present. Ideally, only inert gas is used for drying the polymer.

In another one of its aspects the invention desirably uses nitrogen or another inert gas, most desirably argon, in either a single pass or multiple pass drying system, which gas can be introduced at either a single point or at multiple points in the drying process. The invention allows for one or more temperatures to be used in granular resin drying, with nitrogen or another inert gas, such as argon, being introduced into the drying hopper. When such nitrogen or argon or another inert gas is introduced into the system and even into the drying hopper at multiple points, this allows one or more drying temperatures to be used. Alternatively, air can be used for drying the polymer, in combination with an inert gas, preferably nitrogen.

In a preferred embodiment, the apparatus of the invention has two sub-systems, a first of which includes a membrane and a heater to supply dried, heated inert gas to a first portion of a drying hopper, and a second of which mixes "fresh" inert gas, or even air, with inert gas withdrawn from the drying hopper, heats the resulting mixture of gases, and supplies the mixed gases to a second portion of the drying hopper.

In a preferred embodiment when drying particulate materials, specifically granular plastic resin, the dryer may preferably use a stream of inert gas, preferably either nitrogen or argon, having a dew point of about −75° Fahrenheit.

In another preferred embodiment, the apparatus of the invention has two sub-systems, a first of which includes a dryer and a heater to supply dried, heated inert gas to a first portion of a drying hopper, and a second of which mixes "fresh" inert gas from an inlet, with inert gas withdrawn from the drying hopper, heats the resulting mixture of gases, and supplies the mixed gases to a second portion of the drying hopper.

The dryer is a membrane dryer that substantially maintains its drying capacity under continuous use, without the need for regeneration. For use when drying particulate materials, specifically granular plastic resin, the dryer may preferably use a stream of inert gas, preferably either nitrogen or argon, having a dew point not exceeding 0° Fahenheit, preferably not exceeding −20° Fahrenheit and, more preferably, as low as at least about −40° Fahrenheit.

The invention preferably uses an inert gas, preferably nitrogen or argon, produced using a membrane or other device, to inhibit the degradation of the granular resin material being dried, which degradation is due to oxidation or elevated temperatures.

The invention preferably uses air as the feedstock to produce the required nitrogen, argon, or other inert gas.

The invention allows use of higher drying temperatures, provides faster drying of the granular resin material, and maintains desirable properties of the granular resin material that would otherwise be diminished due to presence of oxygen.

The invention can be used in either a single pass or multiple pass system with nitrogen or argon or another inert gas, or even a mixture of one or both of these with air or with pure oxygen, introduced at a single point or at multiple points in the drying process.

The invention allows for one or more temperatures to be maintained in systems using nitrogen, argon, or even a mixture of one or both of these with air or pure oxygen, with varying temperatures at one or more points in the drying process.

The following Description of the Invention is merely exemplary in nature and is not intended to limit the described invention or uses of the described embodiments. As used herein, the words "exemplary" and "illustrative" mean "serving as an example, instance, or for illustration." Any implementation or embodiment or abstract disclosed herein as being "exemplary" or "illustrative" is not necessarily to be construed as preferred or advantageous over other implementations, aspects, or embodiments. All of the implementations or embodiments described in the following Description of the Invention are exemplary implementations and embodiments that are provided to enable persons of skill in the art to make and to use the implementations and embodiments disclosed below, or otherwise to practice the invention, and are not intended to limit the scope of the invention, which is defined by the claims.

Furthermore, by this disclosure, there is no intention on the part of the Applicant to be bound by any express or implied theory presented in the preceding materials, including but not limited to the Background of the Invention, the Description of the Prior Art, the Summary of the Invention, or in the following Description of the Invention. It is to be understood that the specific implementations, devices, processes, aspects, and the like illustrated in the attached drawing and described anywhere in this application are simply exemplary embodiments of the inventive concepts defined by the claims. Accordingly, specific dimensions and other physical characteristics relating to the embodiments disclosed herein are not to be considered as limiting as respecting the invention, unless the claims or the Description of the Invention expressly state otherwise.

DETAILED DESCRIPTION OF THE INVENTION

Figure 1:
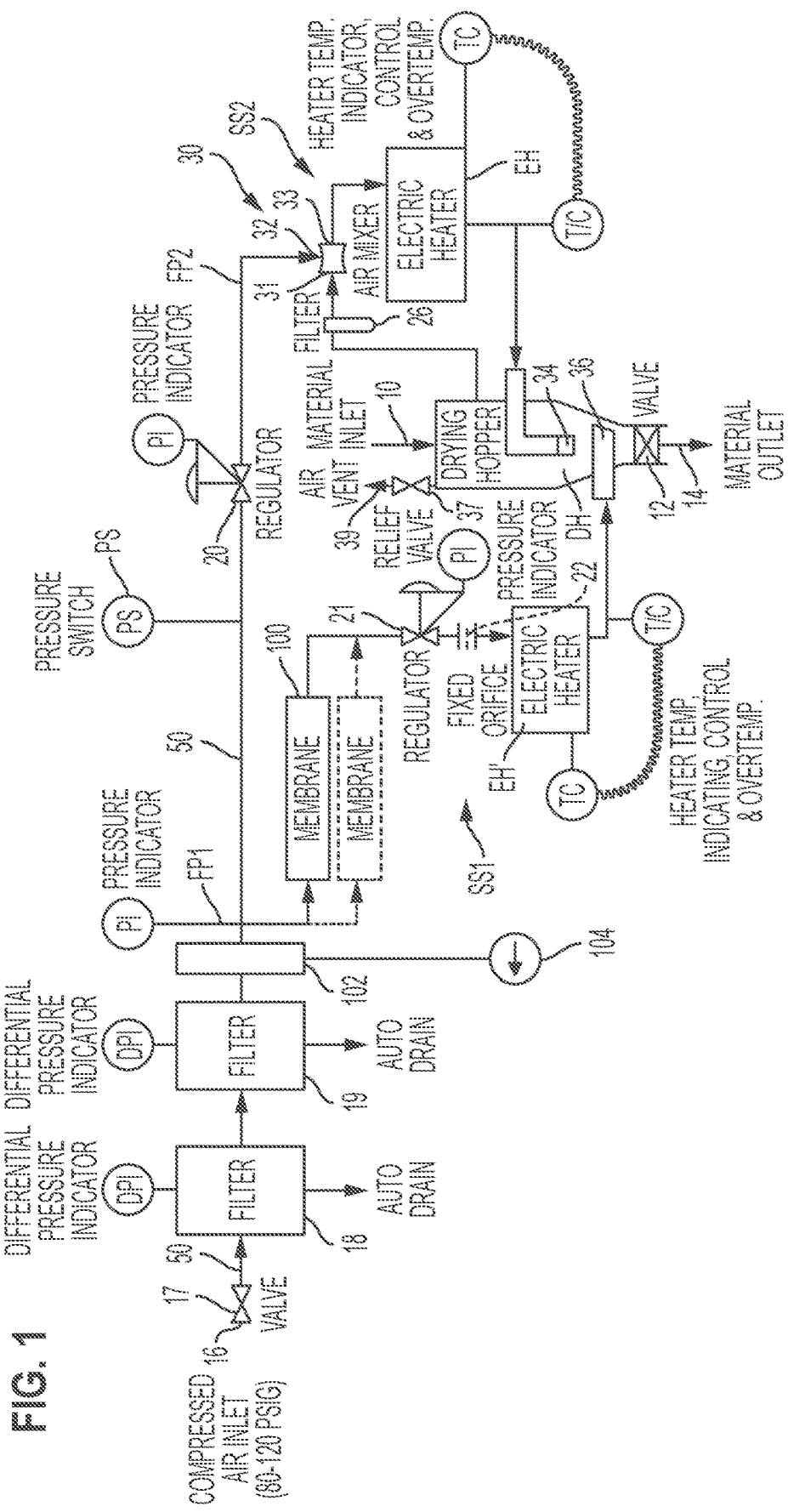
FIG. 1 is a schematic diagram of granular resin material drying apparatus manifesting aspects of the invention.

The apparatus shown in FIG. 1 is designed such that a drying inert gas, preferably nitrogen or argon, supplied to a bed of particulate material, namely granular resin material, is passed through the granular resin material contained in a drying chamber, such as a drying hopper DH, which receives the granular resin material via an inlet 10 at the top of the drying hopper DH. The granular resin material preferably moves slowly downward through drying hopper DH, passes through an outlet valve 12, and is discharged via an outlet 14. The residence time of the granular resin material in hopper DH depends on the particular granular resin material being dried and the desired level of dryness to be achieved.

Still referring to FIG. 1, as the granular resin material moves downwardly through hopper DH, the moisture content of the granular resin material is reduced by a flow of preferably low dew point, namely about −75° Fahrenheit dew point, inert gas that is passed upwardly through hopper DH. The gas is supplied to the hopper via one or more flow paths.

As illustrated in FIG. 1, the inert gas used to dry the granular particulate resin material is furnished by one or more gas separation membranes, one of which has been numbered 100. Pressurized air applied to gas separation membrane 100 results in membrane 100 dividing the compressed air into two streams. One of the streams is gas having molecule size that of oxygen or smaller. These molecules pass easily through the gas separation membrane. The second stream is that of gases having molecule size greater than that of oxygen. The second stream, having molecule size greater than that of oxygen, is typically largely composed of nitrogen, with argon also being present but in a small percentage relative to the nitrogen. Other gases may also be in the second stream. However, because these other gases are present in the atmosphere only in very minute amounts, the second stream will always be principally nitrogen with a lesser amount of argon and minimal amounts of other gases having molecule size larger than that of oxygen.

A heater 102, which is preferably electrically powered and is controlled by a thermostat 104, is positioned in an inlet air conduit 50, which conveys compressed air received at inlet 16, through valve 17 and filters 18 and 19, to heater 102.

The compressed air flows through the schematically illustrated conduit 50 past an unnumbered "T" which splits the compressed air stream into two portions, with one portion going to pressure regulator 20 and a second portion going to membrane 100.

Gas separation membrane 100 is preferably supplied with pressurized air via conduit 50 from a compressed air supply (not shown). In practice, the compressed air inlet 16 may be connected to a manufacturing facility's existing compressed air system for powering pneumatic equipment. Such compressed air systems often include a refrigerant type dryer which provides partially dehumidified air having a dew point of from +40° Fahrenheit to +50° Fahrenheit. Conventional filters 18 and 19 are installed after a conventional valve 17 leading from inlet 16, to remove undesirable contaminants from the compressed air stream before the air stream reaches heater 102.

Continuing to refer to FIG. 1, a portion of the compressed air received from conduit 50 is supplied, via a first flow path FP1, to a first sub-system SS1 that includes membrane 100 and a heater EH'.

In a preferred embodiment membrane 100 provides relatively low dew point inert gas output which is passed to the heater EH' via a pressure regulator 21 and a flow-regulating orifice 22, providing a desired pressure and inert gas flow rate through drying hopper DH. The heater EH' may use any suitable heat source, such as an electric heater as shown in FIG. 1.

The low dew point inert gas from electric heater EH' is fed to a first portion of the drying hopper DH, with the inert gas being introduced into drying hopper DH at a lower portion of drying hopper DH, flowing through the granular resin material in hopper DH, and drawing off moisture from the granular resin material therein.

Still referring to FIG. 1, a second flow path FP2 for the compressed air extends through a pressure regulator 20 to a second sub-system SS2 that includes a mixing device 30 and a heater EH. The mixing device is preferably a pneumatic amplifier, such as the amplifier sold by Nortel Machinery, Inc. of Buffalo, N.Y., although other types of gas mixing devices, such as venturis and ejectors, can be used. Compressed air supplied via a portion of conduit 50 downstream of pressure regulator 20 to a first inlet 32 of the mixing device induces flow of recirculating inert drying gas from an upper portion of drying hopper DH, preferably via a filter 26, to a second inlet 31 of mixing device 30, which mixes inert gas supplied thereto through inlet 31 with air supplied via inlet 32. The resulting gas mixture exits outlet 33 of mixing device 20 and is supplied to the drying hopper DH via heater EH, which may be an electric heater as shown in the drawing. The heated gas mixture enters hopper DH via a diffuser 34, which may be a pipe with a screened outlet, and is supplied to hopper DH via a diffuser 34 located at a second, higher portion of the hopper, above diffuser 36.

As shown in FIG. 1, mixing device 30 combines the inlet stream of inert gas and the inlet stream of air at a predetermined volumetric ratio, which can be adjusted. An appropriate ratio for any given application may readily be determined by trial and error by anyone of skill in this art.

The use of drying gas recirculation is advantageous in that it permits a reduction in the amount of inert gas, and hence the amount of compressed air needed to generate the inert gas required for the drying process; it also allows use of a smaller membrane 100.

In the embodiment of the invention depicted in FIG. 1, most of the drying is affected in the upper portion of hopper DH by the mixture of drying gas received from diffuser 34, which mixture of drying gas is supplemented by the inert drying gas from diffuser 36. The remainder of the drying is affected near the bottom of drying hopper DH by the inert gas from diffuser 36. A relief valve 37 connected to vent 39, venting to atmosphere, prevents undesired pressure build-up in drying hopper DH.

A number of the temperature and pressure indicators and controls depicted in FIG. 1 have not been specifically discussed. Their purpose and function will be readily understood by those skilled in the art. For example, pressure switch PS can shut off air to mixing device 30 when pressure of the drying gas in drying hopper DH is above or below an appropriate value.

While a preferred embodiment of the invention has been shown and described, it will be appreciated by those skilled in the art that various modifications can be made in keeping with the basic principles of the invention. For example, instead of a single membrane 100, a plurality membranes 100 may be used, as indicated by dashed lines in FIG. 1. Further, provisions may be included to control the amount of drying more precisely, such as by providing a detector to monitor the dew point of inert drying gas exiting hopper DH and a pressure controller to adjust pressure of compressed air furnished to membrane 100, depending on the detected humidity, to control the dew point.

Figure 2:
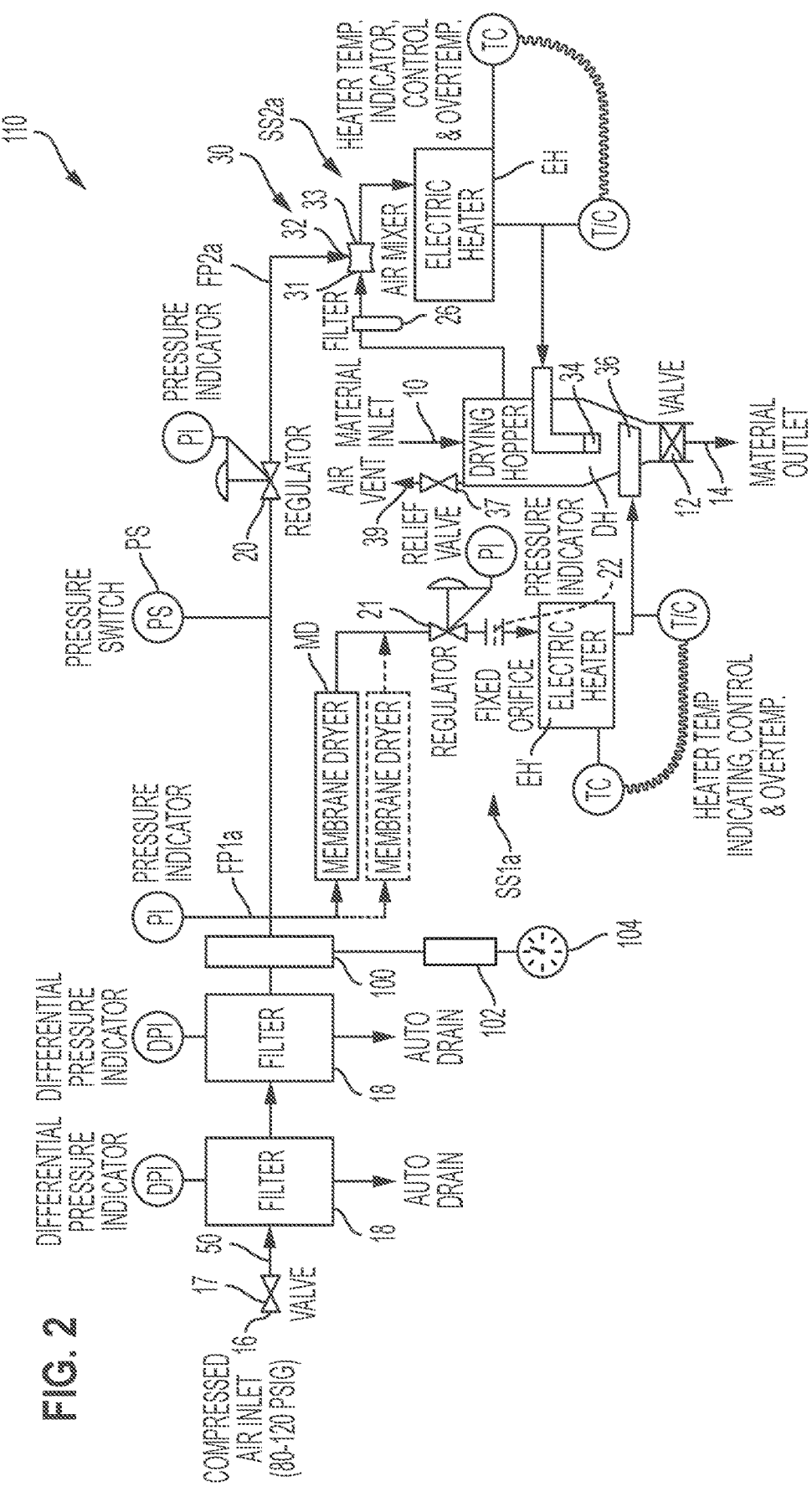
FIG. 2 is a schematic diagram of an alternative embodiment of the granular resin material drying apparatus shown in FIG. 1.

Also, instead of supplying compressed air directly to inlet 31 of mixer 30, the output of membrane 100 can be split, so that flow path FP2 to the inlet 32 of air mixer 30 extends from membrane 100. For example, FIG. 2 depicts one possible embodiment, in the form of a granular resin material drying apparatus 110, in which the inlet 32 of air mixer 30 is supplied with inert gases from the membrane 100. Components of the apparatus 110 that are identical to those of the apparatus described above and depicted in FIG. 1 are identified with identical reference characters.

In the apparatus 110, the heater 102, controlled by the thermostat 104, is connected to the gas separation membrane 100 to control the temperature of the gas separation membrane 100. Unlike the apparatus depicted in FIG. 1, the entirety of the pressurized air supplied to the apparatus 110 and received at inlet 16 passes through the membrane 100. The second stream of gas, namely, the inert gas separated out by gas separation membrane 100, is split after leaving gas separation membrane 100, with the resulting two flows traveling through the schematically illustrated conduits to pressure regulator 20 and to a membrane dryer MD, respectively. As discussed above, the first stream of gas, which is largely oxygen separated out by gas separation membrane 100, is preferably vented to atmosphere at gas separation membrane 100.

Continuing to refer to FIG. 2, one of the flows of inert gas received from gas separation membrane 100 is supplied, via a first flow path FP1$a$, to a first sub-system SS1$a$ that includes a membrane dryer MD and the heater EH'.

In a preferred embodiment, dryer MD is a membrane dryer. Low dew point, typically 10° Fahrenheit to −20°

Fahrenheit, inert gas output from membrane dryer MD, is passed to the heater EH' via the pressure regulator 21 and the flow-regulating orifice 22, to provide a desired pressure and inert gas flow rate through drying hopper DH.

As discussed above in relation to the apparatus of FIG. 1, the warmed, low dew point inert gas from electric heater EH' is fed to a first portion of the drying hopper DH, with the inert gas being introduced into drying hopper DH at a lower portion of drying hopper DH and flowing through the granular resin material in hopper DH, drawing off moisture from the granular resin material therein.

Still referring to FIG. 2, a second flow path FP2*a* for inert gas from membrane 100 extends through the pressure regulator 20 to a second sub-system SS2*a* that includes the mixing device 30 and the heater EH. Inert gas supplied from membrane 100 to the first inlet 32 of the mixing device 30 induces a flow of recirculating inert drying gas from an upper portion of drying hopper DH, preferably via the filter 26, to the second inlet 31 of mixing device 30, which mixes inert gas supplied thereto through the inlets 31 and 32. The mixture of inert gas exits the outlet 33 of mixing device 20 and is supplied to the drying hopper DH via the heater EH, which may be an electric heater as shown in the drawing. The heated mixture of inert gas is supplied to and enters hopper DH via the diffuser 34, which may be a pipe with a screened outlet located at a second, higher portion of the hopper, above diffuser 36.

As shown in FIG. 2, mixing device 30 combines the two inlet streams of inert gas at a predetermined volumetric ratio, which can be adjusted. An appropriate ratio for any given application may readily be determined by trial and error by anyone of skill in this art.

The use of drying inert gas recirculation is advantageous in that it permits a reduction in the amount of inert gas, and hence the amount of compressed air, needed to generate the inert gas required for the drying process; it also allows use of a smaller membrane dryer MD.

In the embodiment of the invention depicted in FIG. 2, most of the drying is effected in the upper portion of hopper DH by the inert drying gas from diffuser 34, which is supplemented by the inert drying gas from diffuser 36. The remainder of the drying is effected near the bottom of drying hopper DH by the inert gas from diffuser 36. This system configuration provides excellent drying performance. A relief valve 37 connected to vent 39 venting to atmosphere prevents undesired pressure build-up in drying hopper DH.

A number of the temperature and pressure indicators and controls depicted in FIG. 2 have not been specifically discussed. Their purpose and function will be readily understood by those skilled in the art. For example, pressure switch PS can shut off membrane dryer MD when pressure of the inert gas received from gas separation membrane 100 is above or below an appropriate value.

While a preferred embodiment of the invention has been shown and described, it will be appreciated by those skilled in the art that various modifications can be made in keeping with the basic principles of the invention. For example, instead of a single membrane dryer MD, a plurality of MD membrane dryers may be used, as indicated by dashed lines in FIG. 2. Also, instead of supplying inert drying gas directly to inlet 31 of gas mixer 30, the output of membrane dryer MD can be split, so that flow path FP2*a* to the inlet 32 of gas mixer 30 extends from membrane dryer MD. Further, provisions may be included to control the amount of drying more precisely, such as by providing a detector to monitor the humidity of inert drying gas exiting hopper DH and a pressure controller to adjust pressure of inert drying gas furnished to membrane dryer MD, depending on the detected humidity, to control the dew point.

Although membrane dryers denoted MD are preferred for use in practicing the invention, other types of dryers may also be employed. While one of the advantages of the invention is that it avoids certain drawbacks of desiccant dryers, it is also possible and appropriate to use a desiccant-type dryer in sub-system SS1*a* in conjunction with sub-system SS2*a*.

Although schematic implementations of the invention and at least some of its advantages are described in detail hereinabove, it should be understood that various changes, substitutions and alterations may be made to the apparatus and methods disclosed herein without departing from the spirit and scope of the invention as defined by the appended claims. The disclosed embodiments are to be considered in all respects as being illustrative and not restrictive, with the scope of the invention being indicated by the appended claims rather than by the foregoing description. All changes coming within the meaning and range of equivalency of the claims are intended to be embraced therein. Moreover, the scope of this patent application is not intended to be limited to the particular implementations of apparatus and methods described herein, nor to any methods that may be described or inferentially understood by those skilled in the art to be present herein.

As discussed above and from the foregoing description of an exemplary embodiment of the invention, it will be readily apparent to those skilled in the art to which the invention pertains that the principles and particularly the compositions and methods disclosed herein can be used for applications other than those specifically mentioned. Further, as one of skill in the art will readily appreciate from the description of the invention as set forth hereinabove, apparatus, methods, and steps presently existing or later developed, which perform substantially the same function or achieve substantially the same result as the embodiments described and disclosed hereinabove, may be utilized according to the description of the invention and the claims appended hereto. Accordingly, the appended claims are intended to include within their scope such apparatus, methods, and processes that provide the same advantage or result, or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for practice of the claimed invention." The scope of the invention is, therefore, indicated by the appended claims rather than by the foregoing description and all changes that come within the range of equivalency of the claims are to be considered to be embraced by the claims. Additional objects, other advantages, and further novel features of the invention will become apparent from study of the appended claims as well as from study of the foregoing discussion and description of the invention, as that study proceeds.

What is claimed is:

1. In a method of drying granular resin material in a hopper including supplying a first portion of air to a membrane; heating gas supplied by the membrane and supplying the heated supplied gas to a first portion of the hopper; supplying a portion of incoming compressed air independently of the membrane to a mixing device; withdrawing heating gas from the hopper and using the mixing device to mix the withdrawn heating gas with incoming compressed air; and supplying the resulting mixture of gases to a second portion of the hopper to heat granular resin material in hopper, the improvement comprising:
   a) furnishing inert gas from a gas separation membrane as the first portion of heating gas; and
   b) regulating temperature of the gas separation membrane by controlling temperature of compressed air supplied thereto to maintain the gas separation membrane at a preselected temperature.

2. The method of claim 1, wherein the improvement further comprises passing heated drying gas through the granular resin material in the hopper in a direction opposite that of granular resin material travel through the hopper.

3. The method of claim 2 wherein the improvement further comprises withdrawing inert heating gas from the hopper in an amount several times the amount of compressed air supplied to the mixing device.

4. The method of claim 1 further comprising passing the compressed air through the mixing device to induce withdrawal of inert heating gas from the hopper.

5. The method of claim 1 further comprising supplying an air-inert gas mixture to the second portion of the hopper in an amount several times the amount of inert gas supplied to the first portion of the hopper.

6. An apparatus for drying granular resin material in a hopper including a first sub-system, including a membrane dryer and a heater receiving drying gas from the membrane dryer to be heated, the first sub-system supplying dried heated gas to a first portion of the hopper; and a second sub-system, including a mixing device and a heater for receiving drying gas from the mixing device to be heated, the mixing device inducing withdrawal of gas from the hopper and mixing the withdrawn gas with gas supplied from the first subsystem, the mixed gases being heated and supplied to a second portion of the hopper, the improvement comprising:
   a) a gas separation membrane for separating inert gases from air supplied to the apparatus and providing the separated inert gas to the first and second subsystems;
   b) a heater for supplying heat to the gas separation membrane; and
   c) a thermostat for controlling the gas separation membrane heater and thereby maintaining the gas separation membrane at a selected temperature.

7. In a method of drying granular resin material in a hopper including supplying a first portion of gas to a membrane dryer; heating gas dried by the membrane dryer and supplying the heated drying gas to a first portion of the hopper; supplying a second portion of heating gas independently of the membrane dryer to a gas mixing device; withdrawing heating gas from the hopper and using the mixing device to mix the withdrawn gas with the second portion of gas; and supplying the mixed gases to a second portion of the hopper to heat granular resin material in hopper, the improvement comprising:
   a) furnishing inert gas from a gas separation membrane as the first and second portions of heating gas; and
   b) regulating temperature of the gas separation membrane by controlling application of heat thereto to maintain the gas separation membrane at a preselected temperature.

8. The method of claim 7, wherein the improvement further comprises passing heated drying gas through the granular resin material in the hopper in a direction opposite that of granular resin material travel through the hopper.

9. The method of claim 8 wherein the improvement further comprises withdrawing inert gas from the hopper in an amount several times the amount of the second portion of inert gas supplied to the mixing device.

10. The method of claim 7 further comprising passing the second portion of inert heating gas through the mixing device to induce withdrawal of inert heating gas from the hopper.

11. The method of claim 7 further comprising supplying mixed inert gases to the second portion of the hopper in an amount several times the amount of inert gas supplied to the first portion of the hopper.

12. An apparatus for drying granular resin material in a hopper including a first sub-system having a membrane dryer and a heater receiving drying gas from the membrane dryer to be heated, the first sub-system supplying dried heated gas to a first portion of the hopper; and a second sub-system having a mixing device and a heater for receiving drying gas from the mixing device to be heated, the mixing device inducing withdrawal of gas from the hopper and mixing the withdrawn gas with gas supplied from the first subsystem, the mixed gases being heated and supplied to a second portion of the hopper, the improvement consisting of:
   a) a gas separation membrane separating inert gases from air supplied to the apparatus and providing the separated inert gas to the first and second subsystems;
   b) a heater supplying heat to the gas separation membrane; and
   c) a thermostat for controlling the gas separation membrane heater to maintain the gas separation membrane at a selected temperature.

13. In a method of drying granular resin material in a hopper including supplying a first portion of gas to a membrane dryer, heating gas dried by the membrane dryer and supplying the heated drying gas to a first portion of the hopper; supplying a second portion of heating gas independently of the membrane dryer to a gas mixing device; withdrawing heating gas from the hopper with the mixing device mixing the withdrawn gas with the second portion of gas; and supplying the mixed gases to a second portion of the hopper to heat granular resin material in hopper, the improvement consisting of:
   a) furnishing inert gas from a gas separation membrane as the first and second portions of heating gas; and
   b) controlling application of heat to the gas separation membrane to maintain the gas separation membrane at a preselected temperature.

14. An apparatus for drying granular resin material in a hopper, comprising:
   a conduit configured to direct inlet air to the apparatus;
   a first heater in fluid communication with the conduit and configured to heat substantially all of the inlet air supplied to the apparatus;
   a gas separation membrane in fluid communication with the first heater, the gas separation membrane being configured to receive no more than a first portion of the inlet air exiting the first heater, and to separate inert gases from the first portion of the inlet air;
   a second heater in fluid communication with the gas separation membrane and the hopper, the second heater being configured to heat the inert gases, and to supply the heated inert gases to a first portion of the hopper;
   a mixing device in fluid communication the first heater and the hopper, the mixing device being configured to induce withdrawal of gas from within the hopper, and to mix the withdrawn gas with a second portion of the inlet air exiting the first heater; and a third heater in fluid communication with the mixing device and the hopper, the third heater being configured to heat the mixture of the withdrawn gases and the second portion of the inlet air, and to supply the heated mixture to a second portion of the hopper.

15. An apparatus for drying granular resin material in a hopper, comprising:

a conduit configured to direct inlet air to the apparatus;

a first heater in fluid communication with the conduit and configured to heat substantially all of the inlet air supplied to the apparatus;

a gas separation membrane in fluid communication with the first heater, the gas separation membrane being configured to receive substantially all of the inlet air exiting the first heater, and to separate inert gases from the inlet air;

a membrane dryer in fluid communication with the gas separation membrane, the membrane dryer being configured to receive no more than a first portion of the inert gases exiting the gas separation membrane, and to dry the first portion of the inert gases;

a second heater in fluid communication with the membrane dryer and the hopper, the second heater being configured to heat the first portion of the inert gases, and to supply the heated inert gases to a first portion of the hopper;

a mixing device in fluid communication the gas separation membrane and the hopper, the mixing device being configured to induce withdrawal of gas from within the hopper, and to mix the withdrawn gas with a second portion of the inert gases exiting the gas separation membrane; and a third heater in fluid communication with the mixing device and the hopper, the third heater being configured to heat the mixture of the withdrawn gas and the second portion of the inert gases, and to supply the heated mixture to a second portion of the hopper.

* * * * *